Aug. 6, 1935.  F. E. SPENCER  2,010,468
GATE HINGE
Filed Sept. 5, 1934  2 Sheets-Sheet 1
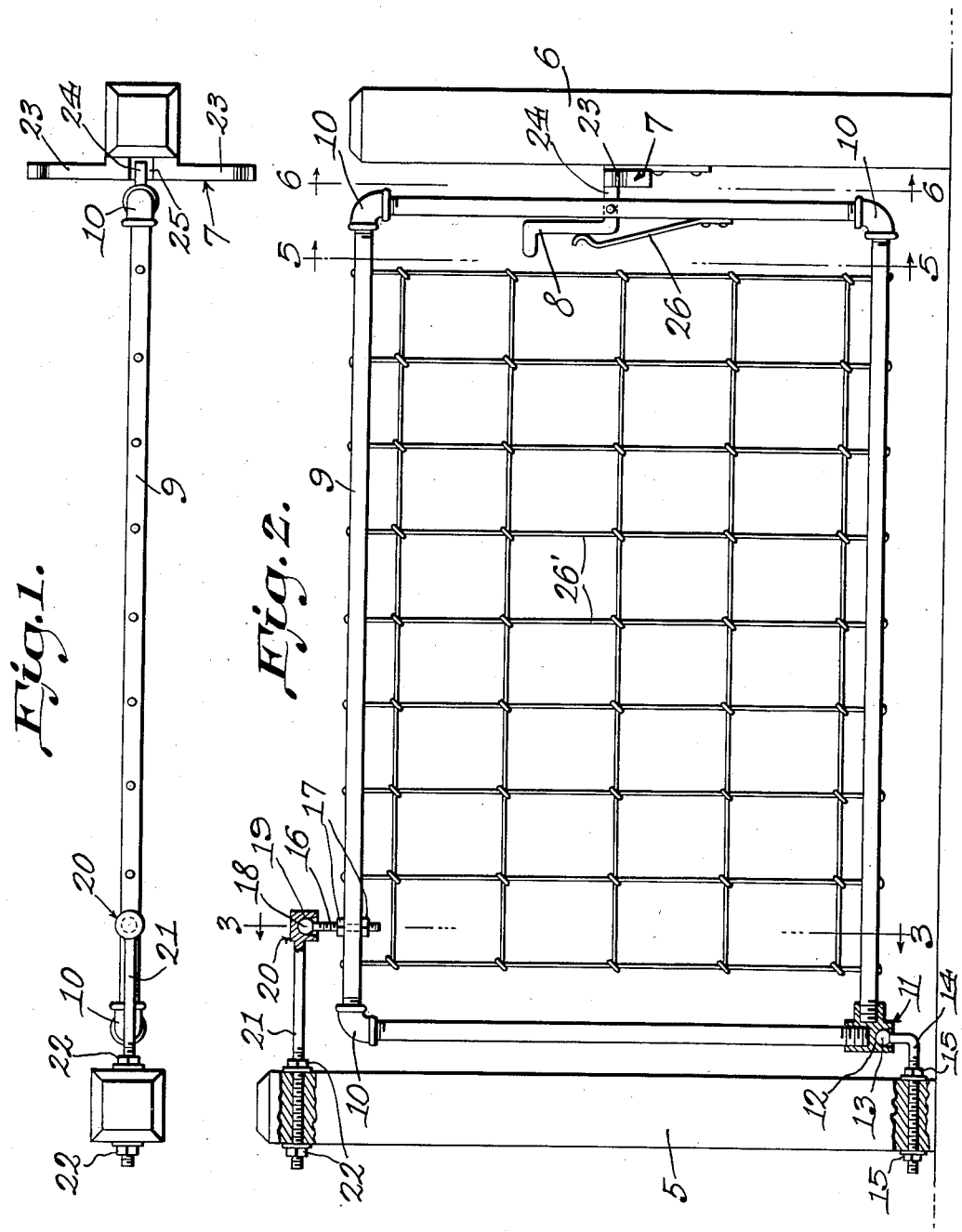
F. E. Spencer Inventor Aug. 6, 1935.   F. E. SPENCER   2,010,468
GATE HINGE
Filed Sept. 5, 1934   2 Sheets-Sheet 2
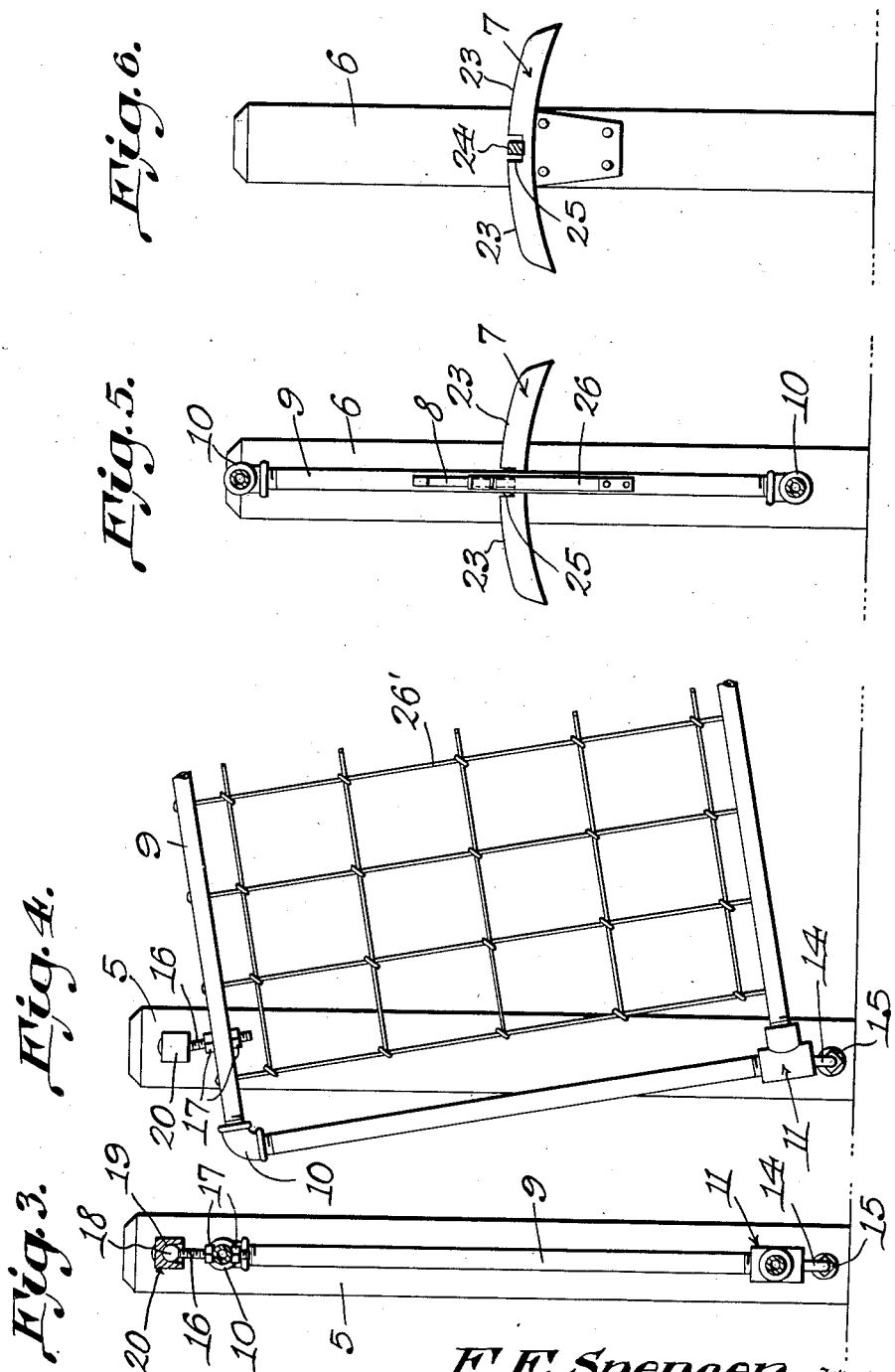

Patented Aug. 6, 1935

2,010,468

UNITED STATES PATENT OFFICE 2,010,468

GATE HINGE

Francis E. Spencer, Indianola, Utah

Application September 5, 1934, Serial No. 742,807

1 Claim. (Cl. 39—22)

This invention relates to gate construction, the primary object of the invention being to provide a gate hinge which will permit the gate to open or swing in either an outward or inward direction, and one which will cause the gate to be tilted when opened, in such a way that the gate will close by gravity, when released.

An important object of the invention is the provision of a hinge which will allow a universal movement of the sections of the hinge with respect to each other, eliminating lateral strain on the hinge due to the hinge sections twisting under the weight of the gate.

A still further object of the invention is to provide a hinge which may be readily and easily dismantled to remove the gate, should it be necessary to repair the gate structure.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

Referring to the drawings:

Figure 1 is a plan view of a gate constructed in accordance with the invention.

Figure 2 is an elevational view thereof the hinges of the gate being shown in section.

Figure 3 is a sectional view taken on line 3—3 of Figure 2.

Figure 4 is a fragmental elevational view illustrating the gate in a partially open position.

Figure 5 is a sectional view taken on line 5—5 of Figure 2.

Figure 6 is a sectional view taken on line 6—6 of Figure 2.

Referring to the drawings in detail, the gate posts are indicated by the reference characters 5 and 6, the gate post 5 being the post to which the hinges, to be hereinafter more fully described, are secured, while the post 6 provides a support for the keeper 7 of the latch 8.

As shown, the gate proper embodies a rectangular frame 9 constructed of lengths of piping connected at their ends, by elbows 10.

The member 11 which connects the adjacent ends of the lower pipe of the frame, and the inner end pipe section is formed with a socket indicated at 12, the socket having substantially vertical walls tapered towards the outer end of the socket, the inner end of the socket being curved to conform to the curvature of the ball 13, which is formed on the upper end of the shank 14 forming a part of the hinge.

This shank 14 is formed with a threaded portion to accommodate the nuts 15, which are secured on opposite sides of the post 5, the nuts 15 acting to clamp the shank 14 in position and prevent turning of the shank, under the weight of the gate.

Extending upwardly from the upper horizontal pipe of the frame 9, and spaced from the inner end of the frame 9, is a shank 16 which is threaded to accommodate the nuts 17 so that the shank may be secured in position.

On the upper end of the shank 16, is a ball 18 that fits in the socket 19 of the head 20 that is formed on the outer end of the shank 21. The wall of this socket member is also tapered towards the bottom of the head 20 so that the ball may be readily fitted within the socket.

Nuts 22 secure the shank 21 against movement.

In order that the gate will be automatically latched in its closed position, the latch embodies curved members 23 over which the finger 24 of the latch moves, when the gate swings to its closed position. As the finger 24 moves over the curved surfaces of the members 23, the finger will be guided to the recess 25 of the keeper, where it is urged into the recess, by means of the spring 26, securing the gate in its closed position.

Due to the construction of the socket members and shanks, it will be seen that by removing one of the shanks, the gate may be readily and easily lifted from its position and removed to facilitate repairs.

It will also be seen that because the upper hinged section connects with the gate, at a point in spaced relation with the inner end of the gate, and the lower hinge section connects with the gate at the inner lower corner thereof, the gate will swing to its closed position under its weight, when the gate has been swung open and released.

The frame 9 is covered with a wire mesh material indicated by the reference character 26'.

Having thus described the invention, what is claimed is:

In a gate, a supporting post, a gate section including a coupling at the lower corner thereof, said coupling having a socket formed with an outwardly inclined wall, a shank extended into the post near the lower end thereof and having an upstanding end formed with a ball fitted in the socket, a substantially long shank extended into the post near the upper end of the post and provided with a head on its outer end, the head being formed with a socket having an outwardly inclined wall, a shank extending upwardly from the gate section in spaced relation with the inner end of the gate section and having a ball fitted in the socket of said head.

FRANCIS E. SPENCER.